United States Patent [19]
Brown

[11] Patent Number: 5,791,634
[45] Date of Patent: Aug. 11, 1998

[54] SUPPORT RAIL ASSEMBLY AND METHOD OF MANUFACTURING SAME

[76] Inventor: S. Scott Brown, HC 79, Box 256, Fenwick, W. Va. 26202

[21] Appl. No.: 735,067

[22] Filed: Oct. 18, 1996

[51] Int. Cl.⁶ .................................................... E04H 17/14
[52] U.S. Cl. .................................. 256/59; 256/1; 256/65
[58] Field of Search ................................ 256/65, 59, 19, 256/1, DIG. 2, 24, DIG. 6, 68, 69

[56] References Cited

U.S. PATENT DOCUMENTS

| | | | |
|---|---|---|---|
| 2,905,126 | 9/1959 | Gaffey | 256/65 X |
| 3,119,588 | 1/1964 | Keats | 256/1 X |
| 3,740,022 | 6/1973 | DiGiovanni | 256/24 |
| 4,535,974 | 8/1985 | Conde | 256/1 |
| 4,610,432 | 9/1986 | Lewis et al. | 256/1 X |
| 5,299,781 | 4/1994 | Barrett et al. | 256/1 X |
| 5,354,037 | 10/1994 | Venegas, Jr. | 256/59 |
| 5,586,423 | 12/1996 | Mullen | 256/65 X |

FOREIGN PATENT DOCUMENTS 2008404  1/1990  Japan ...................................... 256/59

Primary Examiner—Harry C. Kim
Attorney, Agent, or Firm—Isaf, Vaughan & Kerr

[57] ABSTRACT

A support rail assembly (5) for a use on a motor vehicle is disclosed. The support rail assembly has at least one elongate rigid member (7) having a first bent end (8) and a spaced second, end (9). A first elongate flexible member (14) is fastened to the first bent end of the rigid member so that the first flexible member extends co-linear from the first bend end of the rigid member toward a mounting bracket 22 to which the first flexible member is fastened at its other end. A second elongate flexible member 18 is fastened to the second bent end of the rigid member and extends co-linearly from the second bent end of the rigid member and parallel to the first elongate flexible member, the second flexible member being connected at its other end to a second mounting bracket (23). A fastener hole (24) is defined within each mounting bracket through which a threaded fastener, or other fastener, may be passed for fastening the support rail assembly to the motor vehicle so that the support rail assembly can be used to support the hand or foot of a person climbing onto the motor vehicle.

11 Claims, 2 Drawing Sheets 5,791,634

SUPPORT RAIL ASSEMBLY AND METHOD OF MANUFACTURING SAME

FIELD OF THE INVENTION

This invention relates in general to a support rail assembly for use on construction equipment. More particularly, this invention relates to a support rail assembly for use on construction equipment and motor vehicles, as well as on railroad locomotives and rolling stock for use in supporting either the hands or feet of a person climbing thereon, respectively.

BACKGROUND OF THE INVENTION

Construction equipment, for example bulldozers, graders/scrapers, and excavators, have become increasingly large and cumbersome pieces of machinery capable of moving great quantities of earth, for example, in a short period of time. However, what each of these items of construction equipment have in common is an operator, a human operator who is required to climb up and over the equipment in order to gain access to the operator station on the equipment.

For example, the model D-9 bulldozer manufactured by Caterpillar Corporation has become an industry favorite finding wide use in a variety of earth moving operations. Although the D-9 bulldozer is a well constructed and durable piece of machinery, it is much larger then earlier bulldozers, so much so that the operator has a relatively lengthy climb up, on, and over, the treads and under the carriage of the bulldozer in order to gain access to the operator station. Thus, in order to facilitate the operator's access up and over the equipment and into the operator station, Caterpillar, as well as several other construction equipment manufacturers, have provided hand or grab rails attached to the equipment and adapted to be grabbed by hand, and/or stepped on by foot, as necessary, in order to climb over the equipment and into the operator station.

A problem that has arisen, however, centers on the interfacing of the construction equipment, the work environment, and the hand rails as they protrude from the piece of equipment during operation. In particular, when being used in relatively narrow or confined space, it is not uncommon for the hand rails protruding from the sides of construction equipment to become damaged by adjacent rock walls, or become damaged by striking trees, buildings, or other relatively stationary and massive structures which results in significant damage, if not catastrophic failure, of the hand rails so that they are rendered unusable when climbing onto or off of the piece of construction equipment. Another factor which compounds the problem of hand rail reliability is the fact that many of the hand rails now in use are made of hollow tubing bent and formed to shape, and fastened to the equipment. Some hand holds are simply made out of pieces of strip steel which are bent to shape and secured to the equipment. All of these prior art hand rails/hand holds, however can be readily deformed when struck by construction debris, and/or rock walls or other structures in the confined spaces in which the equipment may be operating.

In similar fashion, hand rails/step rails have been used on motor vehicles, for example on the rear of tractor trailer combinations so that people at the loading dock area can climb up to and on the trailer to either secure or remove equipment and/or goods being shipped thereby, as well as for gaining access to the loading dock. However, as these step rails are located at the rear of the trailer, oftentimes they become bent or damaged beyond the point of usability when the trailer is being backed into position with respect to the loading dock and encounters objects or fixtures other than the loading dock bumpers. In similar fashion, step rails, as well as hand rails, are used on railroad equipment, for example locomotives and rolling stock, which also can become damaged due to being struck by objects protruding from passing trains, and/or from coming into contact with loading docks or loading dock equipment, which again makes it difficult, if not impossible, to use the step rails and hand rails for their intended purposes of safely allowing people to gain access to the locomotives and/or rolling stock.

What is needed, therefore, but seemingly unavailable in the art, is a support rail assembly intended for use on motor vehicles, construction equipment, as well as on railroad equipment, which is constructed to be rigid enough to support the weight of a person or persons thereon, yet which will flex when striking a fixed object with respect to the support rail assembly so that it will yield prior to deformation and/or catastrophic failure thereof for insuring the continued availability of the support rail assembly, thus insuring the safety of those using the support rails to gain access over, or climb on, the motor vehicles, construction equipment, and/or railway locomotives and rolling stock to which the support rail assembly is attached. Moreover, an improved support rail assembly is needed for use on motor vehicles, construction equipment and railroad equipment which is relatively rigid, durable, and yet is lightweight and inexpensive to manufacture, and easy to replace should the support rail assembly become damaged necessitating replacement.

SUMMARY OF THE INVENTION

The present invention provides and improved support rail assembly for use on motor vehicles, construction equipment, and railroad rolling stock and locomotives which overcomes some of the design deficiencies of other support rail assemblies known in the art. The support rail assembly of this invention, and the method of manufacturing same, provides a lightweight and inexpensive, yet rigid and durable, support rail assembly constructed to minimize the possibility of damage to the support rail assembly during the course of normal operation of the equipment on which the support rail assembly is fastened and used. Motor vehicle operators, equipment operators, and railroad personnel will now be allowed to safely climb on, over, and walk on the equipment to which the support rail assembly is attached with the knowledge that the support rail assembly will be there for their use when needed. Thus, this invention provides a simple and efficient support rail assembly, and method of manufacturing same, that is readily adapted for use in a wide variety of applications throughout the transportation and construction industries, and is particularly well suited for use on construction equipment, to include earth moving and excavating equipment.

This invention attains a high degree of durability, coupled with lightweight and reduced manufacturing cost by providing a first elongate rigid member having a first end and spaced second end to which a first elongate flexible member is fastened at the first end while a second spaced elongate flexible member, parallel to the first elongate flexible member, is fastened to the second end of the rigid member. The ends of each flexible member extend away from the rigid member to which they are fastened. The support rail assembly can include a second and co-planar rigid member extending perpendicularly from one of the ends of the first rigid member, to which a third flexible member is fastened, the third flexible member having a third mounting plate at its end opposite that attached to the second rigid member for attaching the first and second rigid members to the piece of equipment on which the support rail assembly is used.

The ends of the first elongate rigid member are bent in arcuate fashion to extend 90° away from the rigid member, in a common direction. Similarly, the free end of the second rigid member not attached to the first rigid member is also bent in arcuate fashion at 90° facing away from, and in a direction common to, the same direction as the first two ends of the first rigid member.

Each one of the flexible members is generally identical, and includes a wire rope of sufficient size, i.e. diameter and load bearing capacity, which will not yield to the weight of a person climbing on or using the support rail assembly, yet which will yield to the force of a structure or fixture in close proximity thereto if struck during operation of the equipment. The opposite ends of the wire rope comprising each flexible member are crimped inside of an open ended threaded pipe sleeve so that the threads of the sleeve act as teeth for engaging, and thus locking, the wire rope within the respective pipe sleeves. One of the pipe sleeves at the first end of each flexible member, is passed over the respective ends of the first and second rigid members and welded thereto to affix the flexible member to the rigid members. The open ended pipe sleeve at the other of the ends of each flexible member is welded to a mounting plate, the mounting plate having a hole drilled therein through which a threaded fastener is passed for attaching the mounting plate, and thus the support rail assembly to the motor vehicle or piece of equipment on which the support rail assembly is being used.

Accordingly, this invention also provides a novel method of manufacturing the unique support rail assembly of this invention, which includes the steps of providing a first elongate rigid member having a first end and spaced second end, providing a first end and a second elongate flexible member, each flexible member having a first end and a spaced second end, the first end of each of flexible member being fastened to the first and second ends, respectively, of the rigid member. The opposite ends of each flexible member not attached to the rigid member are attached to a mounting plate.

The method of this invention also includes the steps of manufacturing the flexible members in which a pair of elongate open ended and threaded pipe sleeves are provided for each one of the flexible members. The open ends of one each of the threaded pipe sleeves is passed at least partially over the respective ends of a wire rope and crimped onto the ends of the wire rope. Thereafter, the open ended pipe sleeve at the first end of each flexible member is passed over one of the ends of the rigid member and welded thereto, while the open ended pipe sleeve at the opposite end of each flexible member is welded to a metallic mounting plate in which a fastener hole is defined so that a threaded fastener, or other fastener may be passed therethrough for attaching the support rail assembly to the equipment or motor vehicle on which the support rail assembly is used.

Accordingly, the unique structure, and method of manufacture, of this invention results in an improved support rail assembly which can be used in a variety of industrial and commercial applications with enhanced durability and service life over other support rail assemblies known in the art, all of which allows for greater margins of operator safety in servicing and operating the equipment on which the support rail assembly is attached.

DETAILED DESCRIPTION OF THE PREFERRED EMBODIMENT

Figure 1:
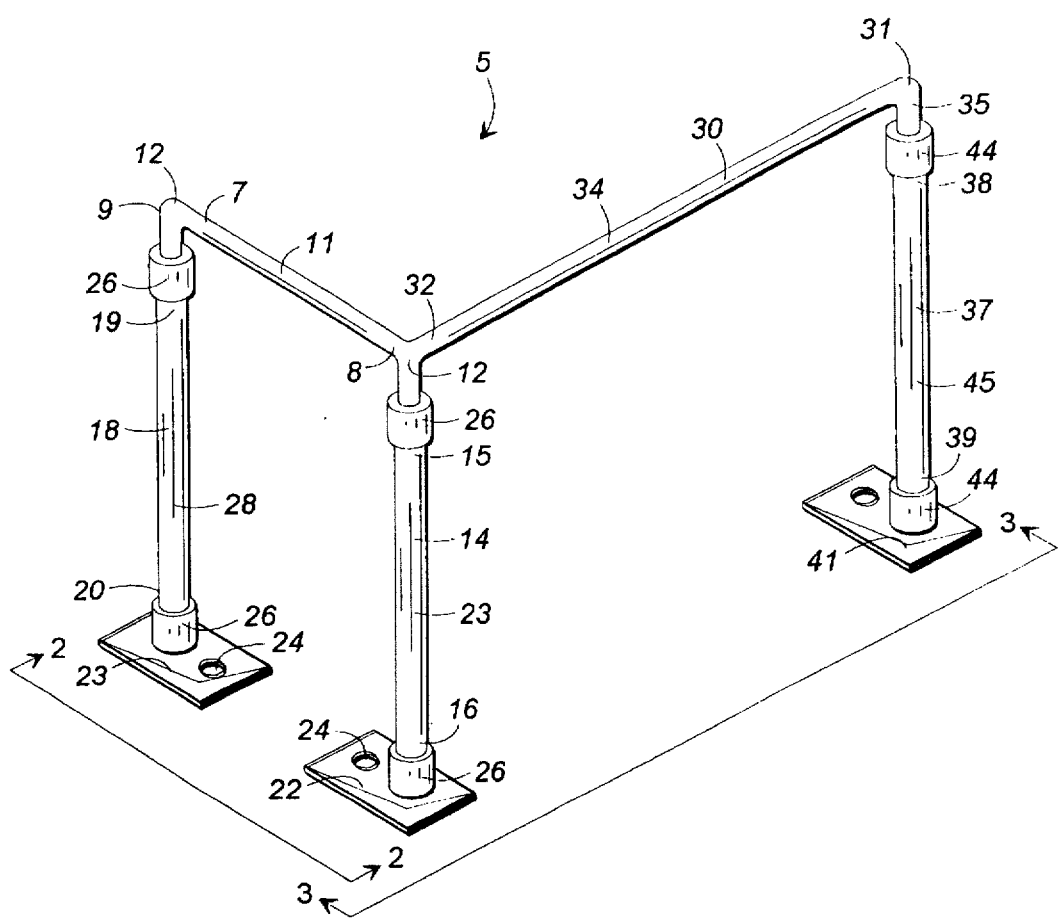
FIG. 1 is a perspective view of a preferred embodiment of the support rail assembly of this invention.
Figure 2:
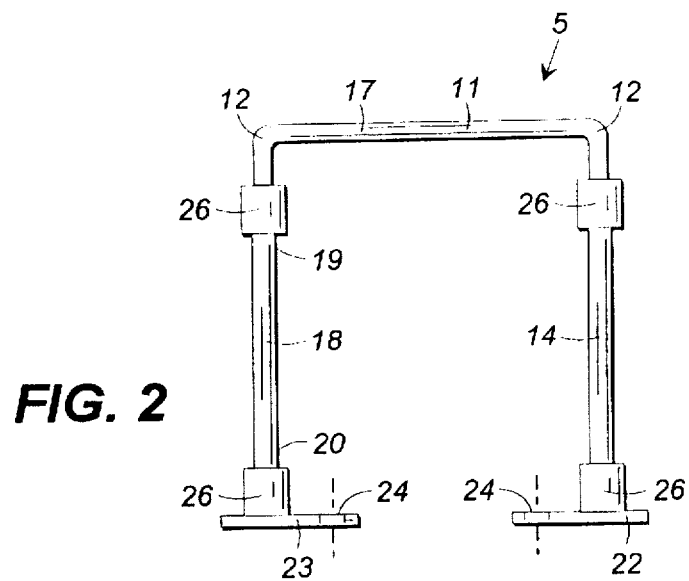
FIG. 2 is a left hand side elevational view along line 2—2 of FIG. 1.
Figure 3:
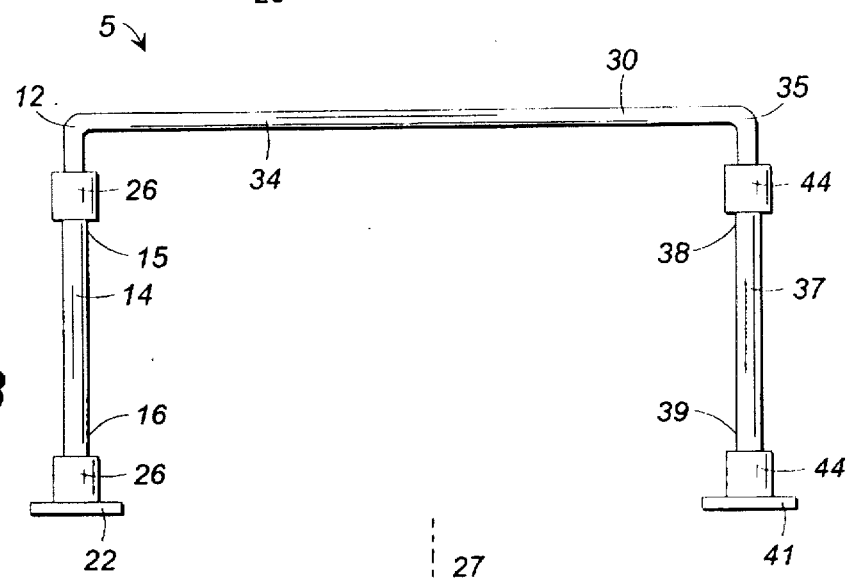
FIG. 3 is a right hand side elevational view along line 3—3 of FIG. 1.

Referring now to the drawings, in which like reference numerals represent like parts about the several views, numeral 5 of FIG. 1 illustrates a preferred embodiment of the support rail assembly of this invention. As shown in FIGS. 1–3, it is anticipated that support rail assembly 5 may be used on construction equipment, commercial vehicles, for example tractor trailer combinations, as well as on railroad locomotives and rolling stock for use as a hand grab rail assembly, as well as a foot rail, or step assembly for use during operation and/or maintenance of the vehicle or equipment to which the support rail assembly, or assemblies, are attached. Thus, and although support rail assembly 5 is described herein for use on a motor vehicle, it is understood by those skilled in the art that support rail assembly 5 can find wide use in a variety of industrial and commercial applications.

Support rail assembly 5 includes a first elongate rigid member 7 as illustrated in FIGS. 1 and 2. First rigid member 7 has a first end 8 and a spaced second end 9. First rigid member 7 is comprised of an elongate section 11 intermediate ends 8 and 9, with an arcuate section 12 formed at each one of the ends of the rigid member. Each one of arcuate sections 12 is bent at a 90° angle with respect to the length of elongate section 11, and the arcuate sections formed at both first end 8 and second end 9 of rigid member 7 are parallel to one another and extend in the same direction with respect to the longitudinal axis of elongate section 11.

A first flexible member 14 is attached to the first end of the rigid member, and second flexible member 18 is attached to the second end of the rigid member. First flexible member 14, as best shown in FIGS. 1 and 2, has a first end 15 and a spaced second end 16. First end 15 is attached to first end 8 of rigid member 7. In similar fashion, second flexible member 18 has a first end 19 and a spaced second end 20, first end 19 of which is fastened to second end 9 of rigid member 7. Attached to the second end of both flexible members 14 and 18, respectively, is a first mounting plate 22 and a second mounting plate 23. In each of the mounting plates a hole 24 is drilled and through which a threaded fastener (not illustrated) is passed for threadely attaching the mounting plates, and thus the first rigid member, to the equipment.

It is anticipated that first rigid member 7 be will a piece of ⅞ inch diameter cold rolled steel approximately 14 inches in length. Flexible members 14, 18 will be 14 inch lengths of 1 inch wire rope or cable in the preferred embodiment of the invention, although differing lengths for each one of flexible members 14, 18, as well as rigid member 7, can be used as desired. One inch diameter wire rope has been specified in that its performance characteristics are such that it will generally support the weight of an average man or women as they grasp either of the rigid members 7, 30 of the support rail assembly, or use them as a foot hold while climbing on or over the motor vehicle or equipment on which the support rail assembly is attached, without yielding to the weight of that person. Thus, if the wire rope which comprises flexible members 14 and 18 is made longer in length than 14 inches, or the diameter of the wire rope is decreased, the possibility does arise that the flexible members will not have the torsional stiffness necessary to resist deformation or bending when the rigid member(s) of the support rail assembly are being grasped by hand or used as a foot step support.

Figure 4:
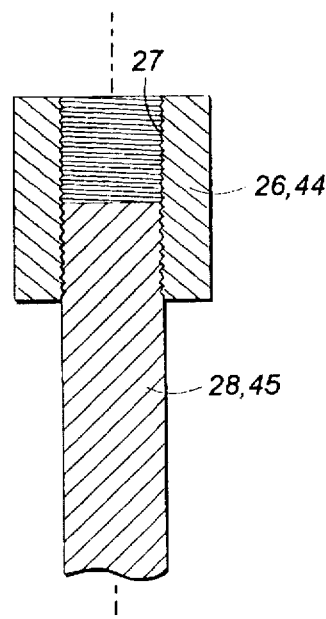
FIG. 4 is a partially cut away detail view illustrating the crimped connection of an open-ended threaded pipe sleeve to one of the ends of the wire rope which comprise the flexible members of the invention.

As illustrated in FIGS. 1 and 2, and as best shown in FIG. 4, an open-ended threaded pipe sleeve 26 is crimped to each one of the two ends of the wire rope which comprises a portion of flexible members 14, 18. As shown in FIG. 4, a 1 inch diameter pipe sleeve 26 having a continuous helical thread 27 defined along the inner circumference thereof is passed at least partially over the ends of the wire rope 28, whereupon the portion of threaded sleeve 27 passed over the wire rope is crimped by the exertion of approximately 1 to ½ tons (2000 to 3000 lbs.) of force to crimp the pipe sleeve on the end of the wire cable with threads 27 acting as teeth to lock sleeve 26 on the ends of the wire rope 28 in conjunction with the deformation of the sleeve 26 as it compresses the ends of wire rope 28. By using a 1 inch diameter threaded pipe sleeve, the ⅞ inch diameter ends 8, 9 of first rigid member 7 can be passed into the open end of one each of sleeves 26, whereupon the sleeves are welded to the ends of the first rigid member 7 using ⅛ inch 701B low hydrogen welding rod in a conventional arc-welding apparatus. As shown in FIGS. 1 and 2, the threaded pipe sleeve 26 at the other end, i.e. the second ends 16, 20 of flexible members 14, 18, respectively, are welded directly to mounting plates 22 and 23 at the end of the mounting plate opposite the 9/16 inch diameter drilled hole within each one of the mounting plates.

A second elongate rigid member 30 may also be provided as a part of support rail assembly 5 as illustrated in FIGS. 1 and 3. Second rigid member 30 has a first end 31 and a second end 32 fastened to first end 8 of first rigid member 7. It is anticipated that second end 32 of second rigid member 30 will be welded to first end 8 of first rigid member 7. So constructed, second rigid member 30 is co-planar with first rigid member 7, and extends perpendicularly away from the first rigid member to form a substantially L-shaped hand rail or foot step. In fashion similar to first rigid member 7, second rigid member 30 has an elongate longitudinal section 34, but only has one arcuate section 35 formed at the first end 31 of the second rigid member, arcuate section 35 being bent through an arc of 90° to face in the same direction as first end 8 and second end 9 of first rigid member 7.

A third flexible member 37 is provided, having a first end 38 fastened to first end 31 of the second rigid member, and a spaced second end 39 fastened to a third mounting plate 41, in which a fastener hole is drilled so that a threaded fastener (not illustrated) may be passed therethrough for mounting the support rail assembly on a motor vehicle or other piece of equipment. Third flexible member 37 is constructed in a fashion identical to first flexible member 14 and second flexible member 18, as illustrated in FIG. 4, and thus the third flexible member has a pair of open-ended pipe sleeves 44 crimped to each end of a wire rope 45, the first end 31 of the second rigid member being passed at least partially into the open end of one of pipe sleeves 44 and being welded thereto, the second pipe sleeve 44 at the second end 39 of the flexible member being welded to third mounting plate 41.

Second rigid member 30 is also formed of a ⅞ inch diameter cold rolled steel bar, and is approximately 28 inches long. Arcuate section 35 is approximately 1½ inches long, as are arcuate sections 12 of first rigid member 7. Flexible member 37 is also comprised of a one inch diameter 14 inch length piece of a wire rope 45, and a pair of open ended threaded 1 inch diameter pipe sleeves 44 sized identically to sleeves 26 illustrated in FIGS. 1, 2, and 4.

Once support rail assembly 5 is constructed, as described hereinabove, any joints or rough edges can be surface finished, whereupon the support rail assembly can be surface finished by being painted or powder coated as desired.

Although threaded pipe sleeves 26, 44 are described as being welded to the end of first rigid member 7 and second rigid member 30, respectively, it is anticipated that the pipe sleeves could be threaded onto threads (not illustrated) formed on the first and second ends, and the first end, of rigid support members 7, 30, respectively, prior to fastening sleeves 26, 44 to mounting plates 22, 23, and 41, respectively. It is preferred, however, that the pipe sleeves be welded to the two rigid members, as well as to the three mounting plates in order to prevent any unwanted loosening of the components of the support rail assembly with respect to one another, and with respect to the piece of equipment on which the support rail assembly is attached.

Support rail assembly 5 as illustrated in FIGS. 1–4 thus presents a simple and cost effective solution to the continuing problem of support rail assembly damage which occurs during the routine use of equipment on which the support rail assemblies are used, thus insuring greater worker safety and minimizing the risk of worker injury while servicing or climbing onto the motor vehicles, construction equipment, and/or railroad equipment to which support rail assembly 5 is attached.

While a preferred embodiment of the invention has been disclosed in the foregoing specification, it is understood by those skilled in the art that variations and modifications thereof can be made without departing from spirit and scope of the invention as set forth in the following claims. In addition, the corresponding structures, materials, acts, and equivalents of all means or step plus function elements in the claims below are intended to include and structure, material, or acts for performing the functions in combination with other claimed elements, as specifically claimed herein.

I claim:

1. A support rail assembly for use on a motor vehicle, said support rail assembly comprising:

a first elongate rigid member having a first bent end and a spaced second bent end, said rigid member comprising a solid metallic rod;

a first mounting bracket spaced from the first bent end of said rigid member;

a second mounting bracket spaced from the second bent end of said rigid member;

a first elongate flexible member fastened at one end to the first bent of said rigid member and extending co-linearly from the first bend end, said first elongated flexible member being fastened at the other of its ends to said first mounting bracket;and a second elongate flexible member fastened at one end to the second bent end of said rigid member and extending co-linearly from the second bent end, said second elongate flexible member being substantially parallel to said first flexible member and being fastened at the other of its ends to said second mounting bracket;

said first and second flexible members each comprising a length of flexible wire rope and a pair of open ended threaded pipe sleeves, one end of each of said pipe sleeves being at least partially passed over each of the ends of said wire rope and being crimped thereon, and wherein said first and second mounting brackets each comprise metallic mounting plates sized and shaped to be fastened to the motor vehicle and defining an opening therein for passing a fastener therethrough to connect said support rail assembly to the motor vehicle such that said first rigid member is spaced from the motor vehicle by said first and said second flexible members.

2. The support rail assembly of claim 1, wherein the first end and the second end of said first rigid member are each bent approximately 90° to face away from said first rigid member in a common direction, wherein each said pipe sleeve crimped on the ends of said first and said second flexible members fastened to said first rigid member is at least partially passed over each respective bent end of said first rigid member and welded thereto, and each of the pipe sleeves crimped on the other respective end of each said flexible member is welded to one each of said mounting plates.

3. The support rail assembly of claim 1, further comprising:

a second elongate rigid member having a first bent end and a spaced second end, said second rigid member being fastened at its second end at the first bent end of said first rigid member and extending away therefrom;

a third elongate flexible member fastened at one end to the first bent end of said second rigid member and extending co-linearly from the first bent end, said third flexible member being substantially parallel to said first and said second flexible members; and a third mounting bracket fastened to said third elongate flexible member, said third mounting bracket being sized and shaped to be fastened to the motor vehicle, said second rigid member being spaced from the motor vehicle by said second and said third flexible members.

4. The support rail assembly of claim 3, wherein said second rigid member is coplanar with and generally perpendicular to said first rigid member.

5. The support rail assembly of claim 3, wherein said second rigid member comprises a solid metallic rod, and wherein said third flexible member comprises a length of flexible wire rope and a pair of threaded pipe sleeves, one each of said pipe sleeves being at least partially passed over each of the ends of said length of wire rope and being crimped thereon.

6. The support rail assembly of claim 5, said third mounting brackets comprising a metallic mounting plate, having an opening defined therein for passing a fastener therethrough for connecting said support rail assembly to the motor vehicle, each said pipe sleeve crimped to the end of said third flexible member extending away from of said third rigid member being fastened to said third mounting plate.

7. The support rail assembly of claim 7, wherein each said pipe sleeve fastened to one each of said mounting plates is welded to each respective one of said mounting plates.

8. The support rail assembly of claim 7, wherein the first bent end and the second bent end of said first rigid member, and the first bent end of said second rigid member are each bent approximately 90° to face away from each said rigid member in a common direction, and wherein each one of said pipe sleeves crimped to the ends of said first, said second, and said third flexible members, respectively, and fastened to said first and said second rigid members, respectively, is passed over the respective ends of said rigid members and welded thereto.

9. A method of producing a support rail assembly for use on a motor vehicle, said method comprising the steps of:

a) bending a first elongate rigid member at each of its spaced first and second ends approximately 90° to form a first bent end and a spaced second bent end oriented in a common direction;

b) passing one of a first pair of elongate open-ended threaded pipe sleeves at least partially over each of the first bent end and the second bent end of said first elongate rigid member;

c) inserting a first end of a first elongate flexible member at least partially within one of said first pair of elongate open-ended threaded pipe sleeves, said first elongate flexible member including a spaced second end;

d) inserting a first end of a second elongate flexible member at least partially within the other one of said pair of elongate open-ended threaded pipe sleeves, said second elongate flexible member including a spaced second end;

e) passing one of a second pair of elongate open-ended threaded pipe sleeves at least partially over each of the second ends of said first and second elongate flexible members;

f) fastening said first pair of elongate open-ended threaded pipe sleeves to the first bent end and the second bent end of said first rigid member;

g) crimping said first and second pairs of elongate open-ended threaded pipe sleeves to each respective one of the ends of said first and said second flexible members;

h) fastening each of the spaced second ends of said first and second elongate flexible members to one of a first mounting bracket and a second mounting bracket; and i) attaching said first mounting bracket and said second mounting bracket to the motor vehicle such that said first elongate rigid member is spaced from the motor vehicle by said first and second elongate flexible members.

10. The method of claim 9, further comprising the steps of:

a) bending a second elongate rigid member having a first end and a spaced second end to form a first bent end;

b) fastening the second end of said second rigid member to one of the first and second spaced ends of said first rigid member so that said second rigid member extends perpendicularly away from said first rigid member;

c) providing a third elongate flexible member having a first end and a spaced second end, fastening the first end of said third flexible member to the first bent end of said second rigid member so that said third flexible member extends co-linearly from the first bent end of said second elongate rigid member and is substantially parallel to said first and said second flexible members;

d) fastening a third mounting bracket to the second end of said third flexible member; and e) fastening said third mounting bracket to the motor vehicle and spacing said second rigid member from the motor vehicle in response thereto.

11. The method of claim 10, wherein steps a), b) and c) further comprise the steps of:

a) providing a pair of elongate open-ended threaded pipe sleeves for said third flexible member;

b) passing one of the open ends of each respective one of said threaded pipe sleeves at least partially over each one of the ends of said third flexible member;

c) crimping said pipe sleeves to each respective one of the ends of said third flexible member;

d) bending the first end of said second rigid member approximately 90° so that said first bent end faces perpendicularly away from said second rigid member;

e) passing the open portion of said pipe sleeve at the first end of said third flexible member at least partially over the first bent end of said second rigid member; and f) fastening the pipe sleeve at the first end of said third flexible member to the first bent end of said second rigid member.

* * * * *